(12) United States Patent
Chou

(10) Patent No.: US 8,059,087 B2
(45) Date of Patent: Nov. 15, 2011

(54) DIGITAL PICTURE FRAME WITH LIGHT-SHIELDING CARRYING PORTION

(75) Inventor: Yuan-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 230 days.

(21) Appl. No.: 12/616,870

(22) Filed: Nov. 12, 2009

(65) Prior Publication Data

US 2010/0265378 A1 Oct. 21, 2010

(30) Foreign Application Priority Data

Apr. 20, 2009 (CN) .......................... 2009 1 0301675

(51) Int. Cl.
*G09G 3/36* (2006.01)
*H04N 5/222* (2006.01)
(52) U.S. Cl. ...................... 345/104; 348/333.01; D6/300
(58) Field of Classification Search ............. 348/333.01, 348/373, 375; 345/104, 204, 2.1, 207; 353/474; D6/300–303
See application file for complete search history.

(56) References Cited

U.S. PATENT DOCUMENTS

| 6,717,567 | B1 * | 4/2004 | Bowden et al. | 345/104 |
| 6,961,046 | B2 * | 11/2005 | Bowden et al. | 345/104 |
| 6,975,308 | B1 * | 12/2005 | Bitetto et al. | 345/204 |
| 2002/0080255 | A1 * | 6/2002 | Lichtfuss | 348/333.06 |

* cited by examiner

*Primary Examiner* — Kelly L Jerabek
(74) *Attorney, Agent, or Firm* — Altis Law Group, Inc.

(57) ABSTRACT

An exemplary digital picture frame includes a frame body, a supporting portion, a carrying portion, an image capturing unit and light sources. The frame body includes a rear surface. The supporting portion extends from the rear surface and is configured for supporting the digital picture frame on a supporting surface. The carrying portion is arranged at the rear surface. The carrying portion includes a mount for facing the supporting surface. The mount is configured for holding a printed picture thereon. The image capturing unit is arranged at the supporting portion and is configured for capturing an image of the printed picture. The light sources are arranged at the supporting portion and are configured for illuminating the printed picture.

12 Claims, 4 Drawing Sheets

DIGITAL PICTURE FRAME WITH LIGHT-SHIELDING CARRYING PORTION

BACKGROUND

1. Technical Field

The present disclosure relates to digital picture frames with light-shielding carrying portions.

2. Description of Related Art

Referring to FIG. 4, a commonly used digital picture frame 400 is shown. The digital picture frame 400 includes a body 410, an image capturing unit 420 mounted on a rear wall of the body 410, and a supporting portion 430. The supporting portion 430 includes two supporting arms 432 rotatably connected to the rear wall of the body 410, and a carrying plate 434 rotatably connected between the supporting arms 432. A printed picture can be placed on the carrying plate 434, facing the image capturing unit 420. The image capturing unit 420 is configured for capturing an image of the printed picture, which can be displayed on a display (not visible) of the digital picture frame.

However, when the image capturing unit 420 captures the image of the printed picture, the printed picture on the carrying plate 434 is exposed to ambient light, which may result in a deterioration of the imaging quality.

Therefore, there is a need for a digital picture frame in which the limitations described are eliminated or at least alleviated.

DETAILED DESCRIPTION

Figure 1:
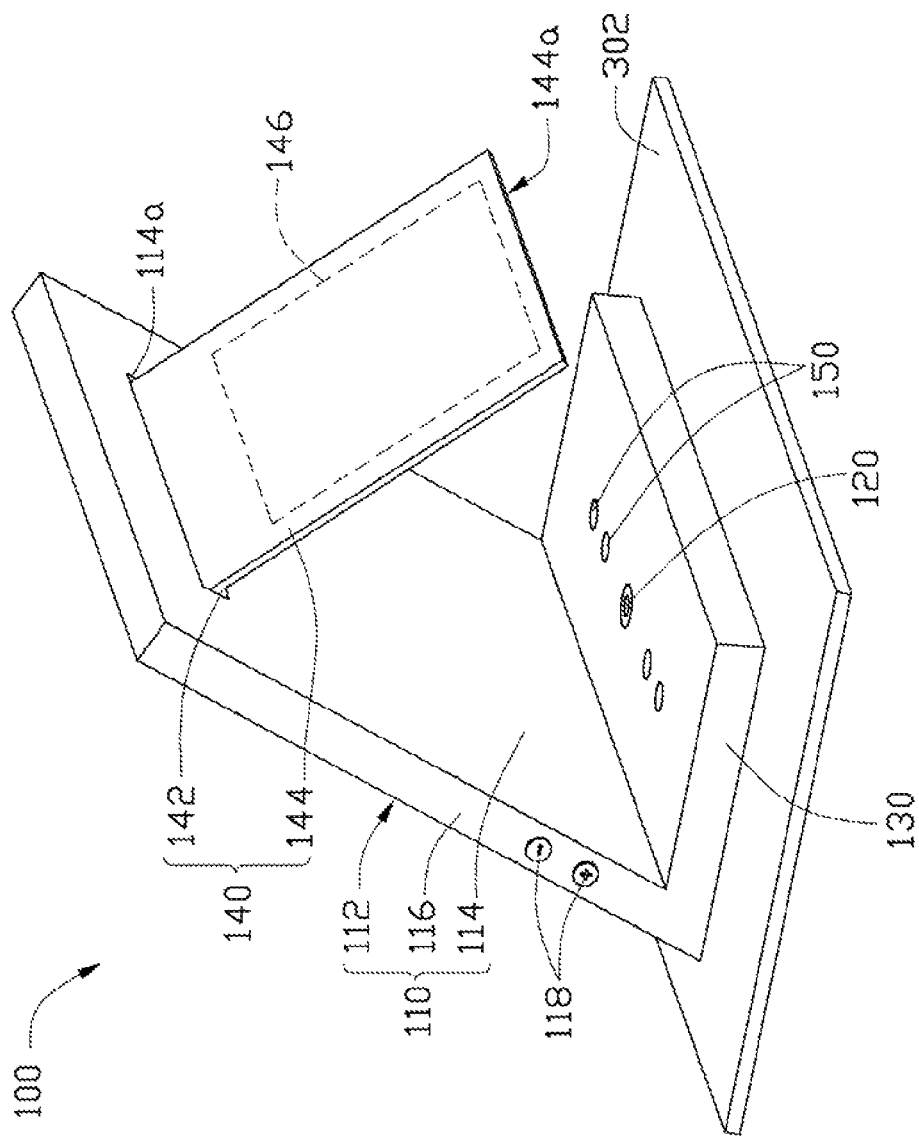
FIG. 1 is an isometric and schematic view of a first embodiment of a digital picture frame, which is positioned on a supporting surface.

Referring to FIG. 1, a first embodiment of a digital picture frame 100 includes a frame body 110, an image capturing unit 120, a supporting portion 130, a carrying portion 140 and a plurality of light sources 150.

The frame body 110 includes a front surface 112 and a rear surface 114 at opposite sides thereof, and a side surface 116 connecting the front surface 112 and the rear surface 114. A display (not visible) is arranged on the front surface 112. An elongated receiving groove 114a is defined in the rear surface 114. A plurality of functional keys 118 are arranged on the side surface 116, providing control of the digital picture frame 100.

The supporting portion 130 extends from the rear surface 114 of the frame body 110 at a predetermined angle, and is configured for supporting the digital picture frame 100 on a supporting surface 302. In this embodiment, the supporting portion 130 is integrated with the frame body 110. That is, the supporting portion 130 and the frame body 110 are together a single body of the one same material. Put another way, the supporting portion 130 and the frame body 110 are together comprised in a one-piece object. The image capturing unit 120 and the plurality of light sources 150 are arranged at the supporting portion 130. The image capturing unit 120 is arranged at a center of the supporting portion 130, and may be an auto-focus image capturing unit with a wide-angle lens module for optimal imaging quality. Each of the light sources 150 is a white light emitting diode in this embodiment. The plurality of light sources 150 are arranged symmetrically at two sides of the image capturing unit 120. The brightness of the light sources 150 can be adjusted by the functional keys 118 and/or by the image capturing unit 120.

The carrying portion 140 is configured for carrying a printed picture. The carrying portion 140 includes a rotor 142, and a carrying plate 144 fixed to the rotor 142. The rotor 142 is rotatably connected to the frame body 110 in the receiving groove 114a. Thus, the carrying plate 144 is rotatably connected to the frame body 110 at the rear surface 114 by the rotor 142. It is to be understood that the frictional engagement between the rotor 142 and the frame body 110 is stronger than the force of gravity acting on the carrying portion 140 but weak enough for the carrying plate 144 to be manually repositioned. Therefore, the carrying plate 144 may be manually rotated about the rotor 142 to any position along its arc of rotation where it will remain until adjusted again. Thus, it is convenient to reposition the carrying plate 144.

Figure 2:
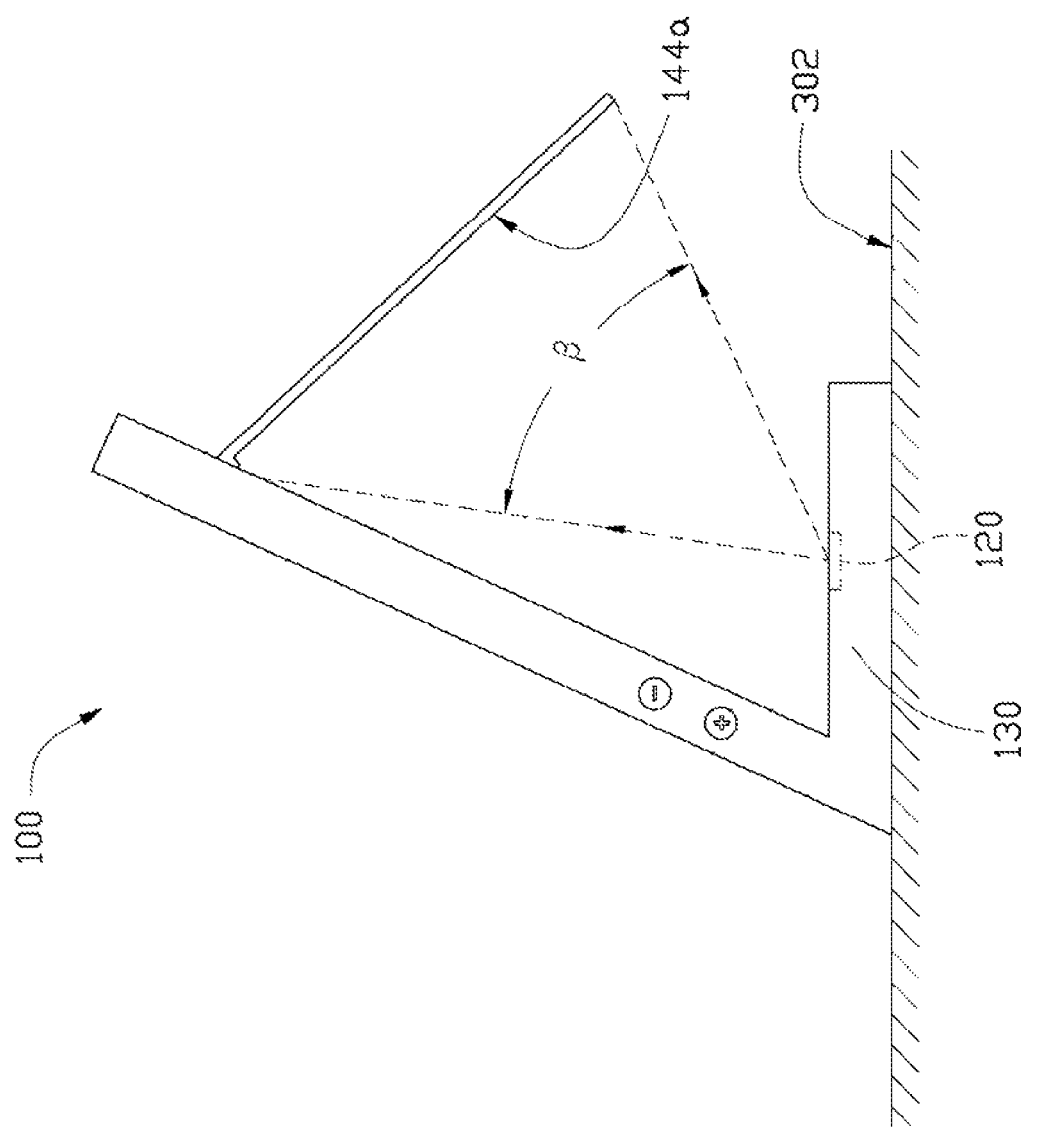
FIG. 2 is essentially a side planar view of the digital picture frame and the supporting surface of FIG. 1.

The carrying plate 144 includes a mount 144a bearing the printed picture thereon. Further referring to FIG. 2, the mount 144a faces the supporting portion 130 and the supporting surface 302. The capturing angle β of the image capturing unit 120 is sufficient to capture an area covering the whole mount 144a. The capturing angle β may be determined by a maximum distance between the image capturing unit 120 and the carrying plate 144. When the image of the printed picture is to be captured, the carrying plate 144 is open to an optimal angle, e.g., 90°, to position the printed picture facing the image capturing unit 120 and the supporting portion 130. The light sources 150 are turned on to illuminate the printed picture. The image of the printed picture is stored in the digital picture frame 100 and can be shown on the display. In this embodiment, an adhesive layer 146 is formed on the mount 144a for holding the printed picture (see FIG. 1). Alternatively, a clip or other suitable fixing means may be used.

The printed picture to be captured is fixed on the mount 144a facing the supporting portion 130 and the supporting surface 302. Therefore, the carrying plate 144 can block part of ambient light, which reduces what might otherwise be a deleterious influence of the ambient light on the image capturing unit 120. The light sources 150 are controllable to illuminate the printed picture to optimize the quality of the image captured by the image capturing unit 120.

Figure 3:
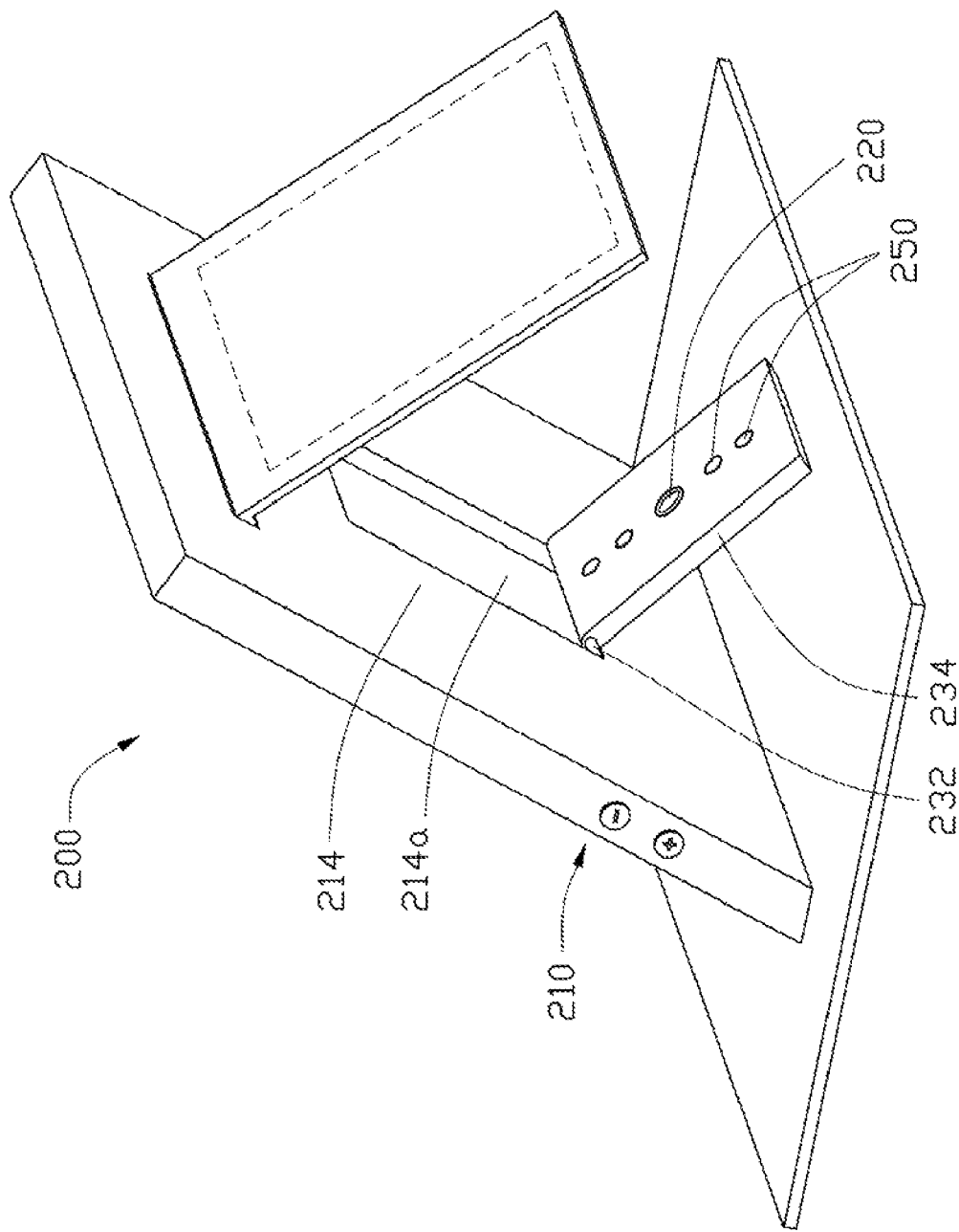
FIG. 3 is an isometric and schematic view of a second embodiment of a digital picture frame, which is positioned on a supporting surface.
Figure 4:
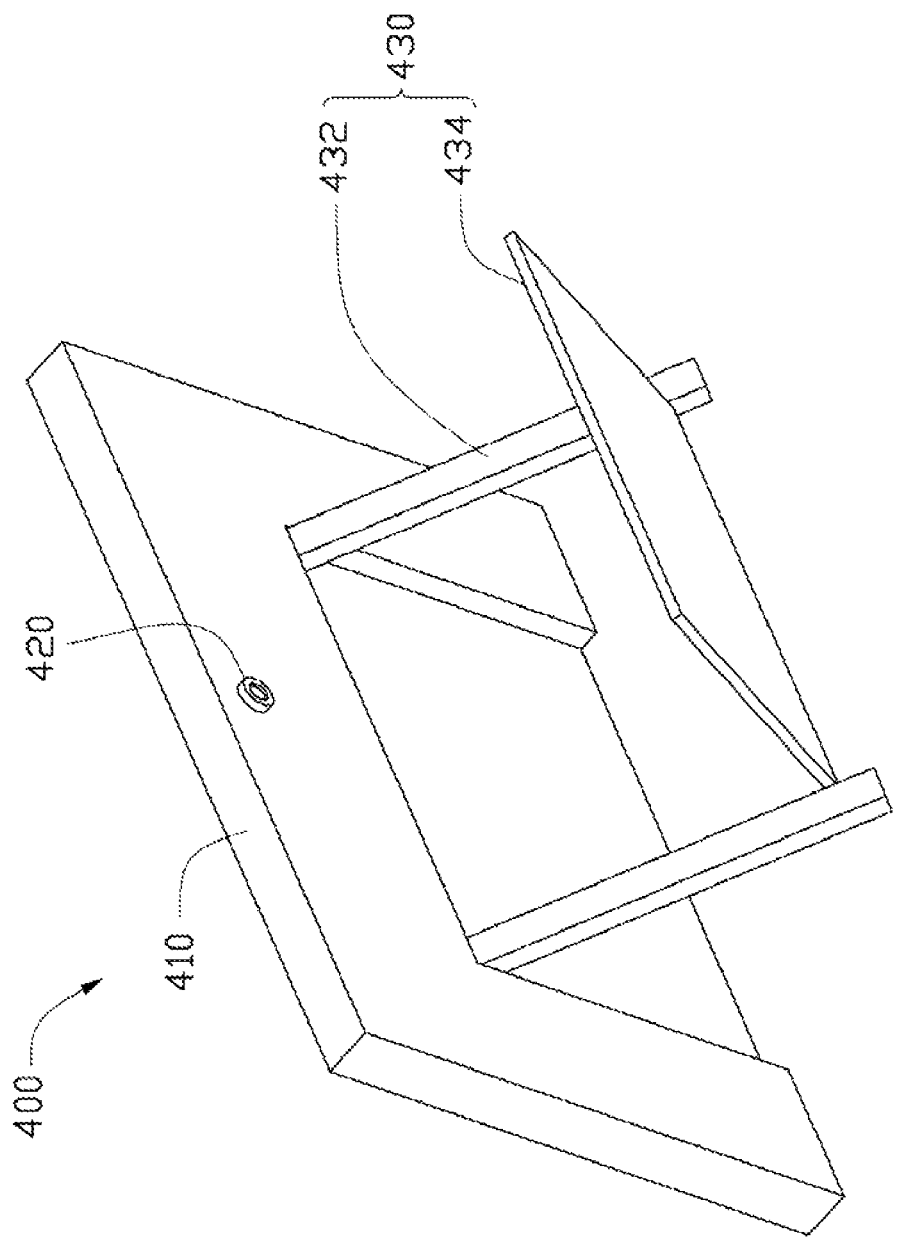
FIG. 4 is an isometric and schematic view of a commonly used digital picture frame.

Referring to FIG. 3, a second embodiment of a digital picture frame 200 is shown. The digital picture frame 200 differs from the digital picture frame 100 in that the digital picture frame 200 has a rotatable supporting portion 230. In this embodiment, the supporting portion 230 is rotatably connected to a frame body 210 at a rear surface 214.

Further, in this embodiment, a receiving recess 214a is defined in the rear surface 214 of the frame body 210. The receiving recess 214a is shaped and sized to suitably receive the supporting portion 230.

The supporting portion 230 also includes a second rotor 232, and a supporting plate 234 fixed to the second rotor 232. The second rotor 232 is rotatably received in a bottom end of the receiving recess 214a, such that the supporting plate 234 is rotatably connected to the frame body 210 at the rear surface 214. An image capturing unit 220 and a plurality of light sources 250 are arranged in the supporting plate 234.

Advantages of the digital picture frame 200 of this second embodiment are similar to those of the digital picture frame 100 of the first embodiment. Furthermore, since the supporting portion 230 is rotatably connected to the frame body 210 at the rear surface 214, the supporting portion 230 can be rotated to be received in the receiving recess 214a when the digital picture frame 200 is not in use, thereby conserving space when the digital picture frame 200 is stowed.

It is to be understood, however, that even though numerous characteristics and advantages of the present embodiments have been set forth in the foregoing description, together with details of the structures and functions of the embodiments, the disclosure is illustrative only, and that changes may be made in detail, especially in matters of shape, size, and arrangement of parts within the principles of the disclosure to the full extent indicated by the broad general meaning of the terms in which the appended claims are expressed.

What is claimed is:

1. A digital picture frame, comprising:
a frame body comprising a rear surface;
a supporting portion extending from the rear surface and configured for supporting the digital picture frame on a supporting surface;
a carrying portion arranged at the rear surface, the carrying portion comprising a mount for facing the supporting surface, the mount configured for holding a printed picture thereon;
an image capturing unit arranged at the supporting portion and configured for capturing an image of the printed picture; and
at least one light source arranged at the supporting portion and configured for illuminating the printed picture.

2. The digital picture frame of claim 1, wherein the supporting portion and the frame body are integrated together in a single body of the one same material.

3. The digital picture frame of claim 1, wherein the carrying portion is rotatably connected to the frame body at the rear surface.

4. The digital picture frame of claim 3, wherein the carrying portion comprises a rotor and a carrying plate fixed to the rotor, the rear surface has a receiving groove defined therein, the rotor is rotatably connected to the frame body in the receiving groove, and the carrying plate comprises a mount.

5. The digital picture frame of claim 1, wherein the at least one light source is at least one white light emitting diode.

6. The digital picture frame of claim 5, wherein the image capturing unit is arranged at a central location of the supporting portion, and the at least one light source comprises a plurality of light sources arranged symmetrically at two sides of the image capturing unit.

7. The digital picture frame of claim 1, wherein the image capturing unit is an auto-focus image capturing unit.

8. The digital picture frame of claim 1, wherein the carrying portion comprises an adhesive layer formed on the mount and configured for holding the printed picture thereon.

9. The digital picture frame of claim 1, wherein the supporting portion is rotatably connected to the frame body at the rear surface.

10. The digital picture frame of claim 9, wherein the supporting portion comprises a rotor and a supporting plate fixed to the rotor, the rotor is rotatably connected to the frame body at the rear surface, and the image capturing unit and the at least one light source are arranged in the supporting plate.

11. The digital picture frame of claim 10, wherein the frame body has receiving recess defined therein at the rear surface, and the supporting portion is rotatable such that the supporting plate is received and stowed in the recess.

12. A digital picture frame, comprising:
a frame body comprising a rear surface;
a supporting portion extending from a bottom end of the frame body and configured for supporting the digital picture frame on a supporting surface;
a carrying portion rotatably mounted to a rear of the frame body and hand adjustable to any set position in a range of angles relative to the frame body, the carrying portion comprising a mount, the mount configured for holding a printed picture thereon;
an image capturing unit arranged at the supporting portion and configured for capturing an image of the printed picture when the mount faces the supporting surface; and
at least one light source arranged at the supporting portion and configured for illuminating the printed picture.

* * * * *